United States Patent [19]

Langer et al.

[11] Patent Number: 5,464,462
[45] Date of Patent: Nov. 7, 1995

[54] METHOD OF MAKING A QUARTZ GLASS TUBE HAVING A REDUCED ULTRAVIOLET RADIATION TRANSMISSIVITY

[75] Inventors: Alfred Langer, Kissing; Andreas Genz, Berlin; Manfred Deisenhofer, Unterschöneberg/Altenmpünster; Walter Kiele, Munich; Bernd Lewandowski, Feldafing; Jürgen Reichardt, Schwabmünchen, all of Germany

[73] Assignee: Patent-Treuhand-Gesellschaft für elektrische Glühlampen mbH, Munich, Germany

[21] Appl. No.: 120,729

[22] Filed: Sep. 13, 1993

[30] Foreign Application Priority Data

Sep. 15, 1992 [DE] Germany ............ 42 30 817.8
Nov. 27, 1992 [DE] Germany ............ 42 40 006.6

[51] Int. Cl.$^6$ ............... C03B 15/14; C03B 5/16; C03C 3/04; C04B 35/44
[52] U.S. Cl. ............... 65/66; 65/86; 65/134.1; 65/134.3; 65/DIG. 9; 501/53; 501/153
[58] Field of Search ............... 65/134, DIG. 8, 65/134.1, 134.3, DIG. 9, DIG. 1, 86, 88, 66; 501/54, 133, 153; 428/34.4; 313/636, 356

[56] References Cited

U.S. PATENT DOCUMENTS

| | | | |
|---|---|---|---|
| 3,764,286 | 10/1973 | Antczak et al. | 65/134 |
| 3,848,152 | 11/1974 | Schultz | 313/221 |
| 4,211,758 | 7/1980 | Buhner | |
| 4,336,048 | 6/1982 | van der Steen et al. | 65/134 |
| 4,361,779 | 11/1982 | van der Sken et al. | 501/54 |
| 4,372,771 | 2/1983 | Coucoulas et al. | 65/86 |
| 4,798,681 | 1/1989 | Oversluizen et al. | 501/54 |
| 5,051,650 | 9/1991 | Taya et al. | 313/112 |
| 5,105,121 | 4/1992 | Sigai et al. | |
| 5,164,630 | 11/1992 | Greiler et al. | 313/25 |
| 5,236,876 | 8/1993 | Van Hal et al. | 65/DIG. 8 |

FOREIGN PATENT DOCUMENTS

| | | |
|---|---|---|
| 2095649 | 12/1993 | Canada . |
| 0264996A1 | 4/1988 | European Pat. Off. . |
| 0389717 | 10/1990 | European Pat. Off. . |
| 0478059A1 | 4/1992 | European Pat. Off. . |
| 0546194 | 6/1993 | European Pat. Off. . |
| 1370013 | 7/1964 | France . |
| 1496072 | 4/1970 | Germany . |
| 63-176315 | 7/1988 | Japan . |
| 5-13841 | 1/1993 | Japan . |

OTHER PUBLICATIONS

Ishii et al, "Preparation of Cerium–Activated Silica Glasses: Phosphorus and Aluminum Codoping Effects on Absorption and Flourescence Properties", J. Am. Ceram. Soc., 70[2], pp. 72–77, Feb. 1987.

Laczka et al, "Synthesis, structure and electron spectra of fused quartz doped with titanium, cerium and neodynium", Glastechnische Berichte, vol. 61, No. 8, Aug. 1988, pp. 218–222.

Bazanova et al., "production of Quartz Tubes with a Selective Spectral Transparency", Steklo; Keramika, No. 1, pp. 32–33, Jan. 1975.

"Glastechnische Berichte" (Glass Technology Reports), vol. 61, No. 8, Aug. 1988, Frankfurt, pp. 218–222, article by Laczka et al.

"Chemical Abstracts", vol. 107, No. 14, Oct. 5, 1987, Columbus, Ohio, US; Abstract No. 119968q, (in English), Z. Pan, p. 276, col. R, Summary and CN-A-103 434 (Shanghai Silicate Institute), Oct. 15, 1986.

*Primary Examiner*—W. Gary Jones
*Assistant Examiner*—Steven P. Griffin
*Attorney, Agent, or Firm*—Frishauf, Holtz, Goodman, Langer & Chick

[57] ABSTRACT

Ultraviolet (UV) radiation in the UV-C and UV-B bands, which is particularly dangerous, is absorbed and filtered by quartz glass doped with between 0.065% and 3.25%, and preferably between 0.065% and 1.3%, by weight, of cerium metal, or cerium as such. Preferably, the cerium is added to quartz sand and/or rock crystal, in form of a fine-grained powder of up to 20 μm grain size, in form of cerium aluminate ($CeAlO_3$), present in up to about 5% by weight, and preferably up to about 2%, by weight, and melted together in a single step. The quartz glass so obtained is particularly suitable for a metal halide discharge lamp, e.g. as an outer envelope (1), or as the discharge vessel (27) itself, or for halogen incandescent lamps, to form the quartz-glass light bulb or an envelope therefor. A small quantity of titanium oxide, up to about 0.05%, may be added as a further doping agent to the melt to further improve the UV absorption in the B and C bands.

32 Claims, 5 Drawing Sheets

METHOD OF MAKING A QUARTZ GLASS TUBE HAVING A REDUCED ULTRAVIOLET RADIATION TRANSMISSIVITY Reference to related patent, and patent application, assigned to the assignee of the present invention, the disclosures of which are hereby incorporated by reference:
U.S. Pat. No. 5,164,630, Greiler et al
U.S. Ser. No. 07/805,858, filed Dec. 10, 1991, Genz.
Reference to U.S. Patents, the disclosure of which is hereby incorporated by reference:
U.S. Pat. No. 5,051,650, Taya et al.
U.S. Pat. No. 3,764,286, Antczak et al.
U.S. Pat. No. 4,336,048, Van der stien et al.
Reference to related publication:
EP-A 389 717, Saito et al.

FIELD OF THE INVENTION

The present invention relates to a glass, and more particularly a quartz glass, which transmits radiation in the visible range of above 380 nm, but is essentially opaque to ultraviolet (UV) radiation, and especially in the UV, C and B bands, by absorbing short-wave UV radiation, to a method of making such a glass, and to use of such glass in electrical apparatus, and more particularly in discharge lamps in which an arc is enclosed within a vessel, which may be double wall, that is, including an outer bulb, and in which the arc generates radiation including UV radiation in all three bands.

DEFINITION

In the specification, and in the claims, all percentages are per weight, unless otherwise described.

BACKGROUND

Discharge lamps are efficient light sources; such lamps, when used as light sources for film and television recording, as well as for theatrical and similar uses, usually have power ratings between about 100 W and several thousand W. These lamps may be single-based or double-based. The discharge vessel itself, which surrounds a discharge chamber, can be surrounded by an outer bulb. The wall loading of the discharge vessel is typically between about 50–100 W/cm$^2$ at a temperature in the order of about 1000° C. If an outer bulb is used, the loading on the outer bulb is, typically, half as large.

The light spectrum emitted by these lamps closely approximates the characteristics of daylight. The color temperature is between about 5000–6000 K., with excellent color rendition; the color rendition index Ra is usually above 90. The emitted spectrum has a relatively high proportion of continuous radiation with dense spectral lines derived from rare-earth atoms in the fill of the discharge chamber, which are superimposed above the remainder of the spectrum.

Lamps of this type are described in the referenced patents and application assigned to the assignee of the present invention, the disclosures of which are hereby incorporated by reference, namely U.S. Pat. No. 5,164,630, Greiler et al, and U.S. Ser. No. 07/805,858, filed Dec. 10, 1991, Genz, a co-inventor of the present application.

The lamps have excellent radiation and operating characteristics. They do, however, have a problem in that about 10% of the radiation energy is within a spectral band which is undesired. Short-wave radiation, and especially very short wave UV-C radiation, is particularly dangerous for human skin. In natural sunlight, the amount of UV radiation within the C band is small. Another problem is the UV radiation within the UV-B band, which may lead to sunburn. The proportion of UV radiation in the UV-A band can be tolerated, if it is not too high. UV-C radiation has a wave length of less than 280 nm; UV-B radiation has a wave length between 280 mn and 315 nm; and UV-A radiation has a wave length of between 315 nm and 380 nm. Normal quartz glass is transparent to the UV radiation in the C, B and A bands.

It has been proposed to reduce the UV portion of radiation by coating the bulb or vessel of a discharge lamp with metal oxides, particularly titanium oxide or zinc oxide—see U.S. Pat. No. 5,051,650, Taya et al. It has also been proposed to use titanium and/or cerium oxide as a doping of a quartz-glass bulb, by adding about 10–300 ppm, see European Patent EP-A 389 717, Saito et al.

U.S. Pat. No. 4,336,048 Van der stien et al., to which European Patent Disclosure Document 0 019 327 B1 corresponds, describes a process of making doped glass, in which a melt of quartz powder and doping material is prepared which is then sintered to provide a concentrate. The doped glass is made by melting the quartz powder together with the sintered concentrate in a protective gas atmosphere formed of helium and hydrogen (He—H$_2$) which, for example, is described in the U.S. Pat. 3,764,286, Antczak et al. A tungsten boat is usually used as the melting furnace. This process has the disadvantage that the manufacture of the doped quartz glass requires two melting steps or melting processes, both of which are highly energy-intensive.

THE INVENTION

It is an object to provide a glass which transmits visible radiation, but functions, simultaneously, as a protective shield with respect to UV radiation, and especially in the UV-B and UV-C bands, by essentially entirely absorbing the UV portion of the radiation below 315 nm (B and C bands), to provide a method for manufacture of such glass and, further, to provide discharge lamps which have all desirable characteristics of good color rendition and high color temperature without, however, emitting undesired or harmful radiation.

Briefly, the glass is doped with a compound comprising cerium, and wherein the cerium is present between about 0.065% and 3.25%, by weight, and preferably between about 0.065% and 1.3%, by weight, with respect to the overall weight of the glass. An electrical apparatus which, in operation, emits radiation in the UV-C, UV-B and UV-A bands, as well as visible radiation, for example a discharge lamp, includes a shielding element which, for example, may be the envelope defining a discharge chamber, or an outer bulb envelope for a discharge lamp, of this doped quartz glass.

In accordance with a feature of the invention, only a single melting step is employed by melting together quartz sand and/or rock crystals and a doping substance which is formed of cerium aluminate (CaAlO$_3$), preferably in powder form, homogeneously mixed with the quartz sand and/or the rock crystal. Preferably, the grain size of the cerium-aluminate powder is up to 20 µm or less. The cerium-aluminate powder can be made from an initial mixture of cerium oxide, CeO$_2$ and aluminum oxide, Al$_2$O$_3$, which are heated to glowing temperature when solid. The mol-relationship of the components aluminum oxide and cerium oxide, in the initial mixture, preferably, are:

$Al_2O_3 : CeO_2 \geqq 0.5:1$.

By weight, the quantity of cerium aluminate, $CeAlO_3$ with respect to the quartz sand and/or the rock crystal is up to about 5%, and preferably between 0.1% and 2%. Titanium oxide, $TiO_2$, can be added as a further doping compound and homogeneously mixed into the quartz sand and/or the rock crystal.

The cerium doping of the quartz glass in accordance with the invention, particularly when used as the vessel or as an outer bulb for a discharge lamp, is substantially higher than prior dopings. The result will be that the UV radiation is not only attenuated but, and particularly in the critical ranges of UV-C and UV-B bands, the UV radiation is entirely absorbed. It has been found, surprisingly, that the characteristics of a discharge lamp are not degraded but, rather, are improved. The absorption of UV radiation due to the cerium at the extremely high doping level generates a noticeable proportion of fluorescent radiation which occurs primarily in the blue spectral range and thus supports the radiation in the blue band emitted from the arc, that is, the light source, directly.

The UV absorption in the quartz glass which contains the comparatively large doping of cerium leads, additionally, to heating of the glass, for example a lamp vessel, when subjected to the UV radiation. This, and particularly in discharge lamps, improves the lamp operating conditions since, due to the heating of the vessel or bulb, due to the absorbed radiation, less electrical energy is necessary to maintain the operating temperature of the discharge vessel.

The type of quartz glass and the lamp fill can be conventional. A typical fill uses a noble gas and mercury, cesium and/or halides of the foregoing, and other metals, particularly rare earths, such as dysprosium and/or holmium. The UV radiation generated by the conventional fill and, in dependence on the use of the quartz glass and the fill composition itself, may make it desirable to add a titanium compound in addition to the cerium compound as a doping agent to the quartz glass. The titanium compound supports the absorption characteristics of the cerium compound in the region of the UV radiation which must be absorbed, namely in the C and B ranges.

Suitable cerium compounds are, preferably, oxides such as $CeO_2$ and $Ce_2O_3$; additionally, mixed oxides of the type $ABO_x$ can be used, in which A is cerium, B one or more metals differing from cerium, and O is oxygen. Particularly suitable are mixed oxides of the type $CeMO_3$, where M is a metal; a particularly suitable metal is aluminum.

Suitable titanium compounds are oxides, such as $TiO_2$.

Doping below 0.065% (by weight) of the cerium portion as such, corresponding to a proportion of 0.08% of $CeO_2$, the remainder $SiO_2$, is too low to obtain complete absorption below a wave length of 315 nm—entirely independently of the wall thickness of the glass, in a lamp, the wall thickness of the vessel, for example. Doping above 3.25% of the cerium portion as such, for example 4.0% by weight of $CeO_2$, causes difficulties in manufacturing. Preferably, in order to obtain homogeneous quartz glass without bubbles, suitable for discharge vessels or lamp bulbs, the cerium portion as such does not exceed 1.3%. A particularly suitable range for doping is 0.15% to 0.45% of the cerium part as such, if the wall thickness of a lamp vessel or of a glass, in general, is about 1 mm. Typical wall thicknesses for discharge vessels are 0.7 mm to 5 mm, especially 1 to 2.8 mm. If the wall thickness if greater than 1 mm, doping can be reduced in accordance with the well-known exponential law of optical wave lengths, since the longer path length of radiation compensates for the lower doping.

The absorption effect in the UV-C range and the UV-B range is enhanced by adding a titanium oxide at a proportion of up to about 0.05%, preferably about 0.02% to 0.03%, of the titanium, as such.

Use of doped glass is particularly suitable in double-envelope envelope lamps, in which the doped glass is used in the outer envelope, since the wall loading of the glass of the outer envelope is substantially less than when the glass directly forms the discharge vessel. When using the glass as an outer envelope, the full band width of the doping, in accordance with the invention, can be used without having to consider possible manufacturing difficulties which might arise.

If the doped glass is used directly as the discharge vessel, the doping should be selected to be rather in the lower range, since the thermal loading of the quartz glass decreases as the doping increases, and, possibly, the overall lifetime of the lamp could be reduced.

The point at which 50% of radiation is transmitted, which could be termed a critical point, of the doped glass can be shifted, roughly, by about 20 nm. Generally, in a proportion of 0.25% of cerium as such, the critical point is at about 350 nm; in a proportion of 0.51% of cerium as such, it is shifted to 360 nm.

The method of making the glass, in accordance with the present invention, has the advantage that only a single melting step is needed, so that the process is substantially less expensive than prior art processes.

The transparency of the quartz glass in accordance with the present invention to ultraviolet (UV) light is completely attenuated or reduced by the effect of the cerium ions which absorb the UV radiation. Cerium is added in the form of cerium aluminate, $CeAlO_3$ to the starting product for the quartz melting step. Use of cerium aluminate for doping of the quartz has additional, entirely unexpected and surprising advantages.

Cerium aluminate is a stable chemical compound which is also stable in free air. This is in contrast to the cerium oxide, frequently used, in small quantities, as doping material. Cerium aluminate does not liberate oxygen in the melting furnace during manufacture of the quartz glass. This method, of using cerium aluminate, first permits manufacture of quartz glass with cerium in a single step, and especially a single melting step, in which doped glass is continuously melted in a tungsten boat in a protective atmosphere and continuously drawn out by a nozzle, with a mandrel made of molybdenum, to provide a quartz-glass tube, without danger or damage to the tungsten boat by oxidation processes, which may result in contamination by tungsten of the quartz glass. This method, thus, is substantially less expensive, by about a factor of 15, than the prior art two-step manufacturing processes, in which the raw material first must be melted to a quartz-glass block or an ingot, and shaping, for example in form of tubes or caning, is done later in a second melting process.

Adding aluminum simultaneously together with the cerium, wherein the aluminum is initially in form of cerium aluminate, has the important advantage that the aluminum increases the solubility of the cerium in the quartz glass. The process, in accordance with the present invention, thus results in highly homogeneous quartz glass with a particularly high proportion of cerium therein. The relationship of cerium to aluminum, determined by the cerium aluminate, of about 5.2:1, is particularly suitable for solubility of cerium in quartz glass. The relationship, by weight, of 5.2:1 corresponds to the quotient of the atomic weights of cerium and aluminum, and results in a mol relationship of 1:1.

To obtain quartz glass which is highly homogeneous and free from mechanical stresses and strains, the starting product for the quartz melt has cerium aluminate added thereto, in which the cerium aluminate is in powder form, preferably having an average grain size of only up to about 20 μm. It has been found particularly desirable to make the cerium aluminate from an initial mixture of aluminum oxide, $Al_2O_3$, and cerium oxide, $CeO_2$, which is mixed with boric acid ($H_3BO_3$) as a mineralization aid. This initial mixture of aluminum oxide, cerium oxide and boric acid is subjected to a solid substance roasting process or glow-heating, in a reducing atmosphere. Preferably, the initial mixture has about 10% excess aluminum oxide with respect to a stoichiometric composition of cerium aluminate ($CeAlO_3$), which results in a uniform and complete conversion of the cerium oxide in the roasting or heating process.

The cerium aluminate doping portion for the quartz melt can be up to about 2%, by weight, without resulting in non-homogeneities in the melted quartz glass. The transparency of the quartz glass for ultra short-wave radiation, that is, in the UV-C band, can be further reduced by adding titanium oxide, $TiO_2$, as a further doping substance. Surprisingly, it has been found that the finished quartz-glass structure or body has a further decrease in UV transmission after it has been subjected to a glow heating process in an oxygen atmosphere at a temperature of between 1000° C. and 1100° C.

The doped quartz glass, made in accordance with the present invention, has good optical qualities and is particularly suitable as a component for electrical apparatus, and especially for electrical lamps. The quartz glass can be used as the vessel which defines a discharge chamber therein, or as an outer bulb for known or conventional discharge vessels of high-pressure discharge lamps; it is not restricted to discharge lamps, however, and can also be used as a bulb or vessel structure for halogen incandescent lamps. The quartz glass in accordance with the present invention absorbs essentially all the UV radiation which is emitted from a discharge arc or, respectively, an incandescent filament.

DRAWINGS

DETAILED DESCRIPTION

Figure 1:
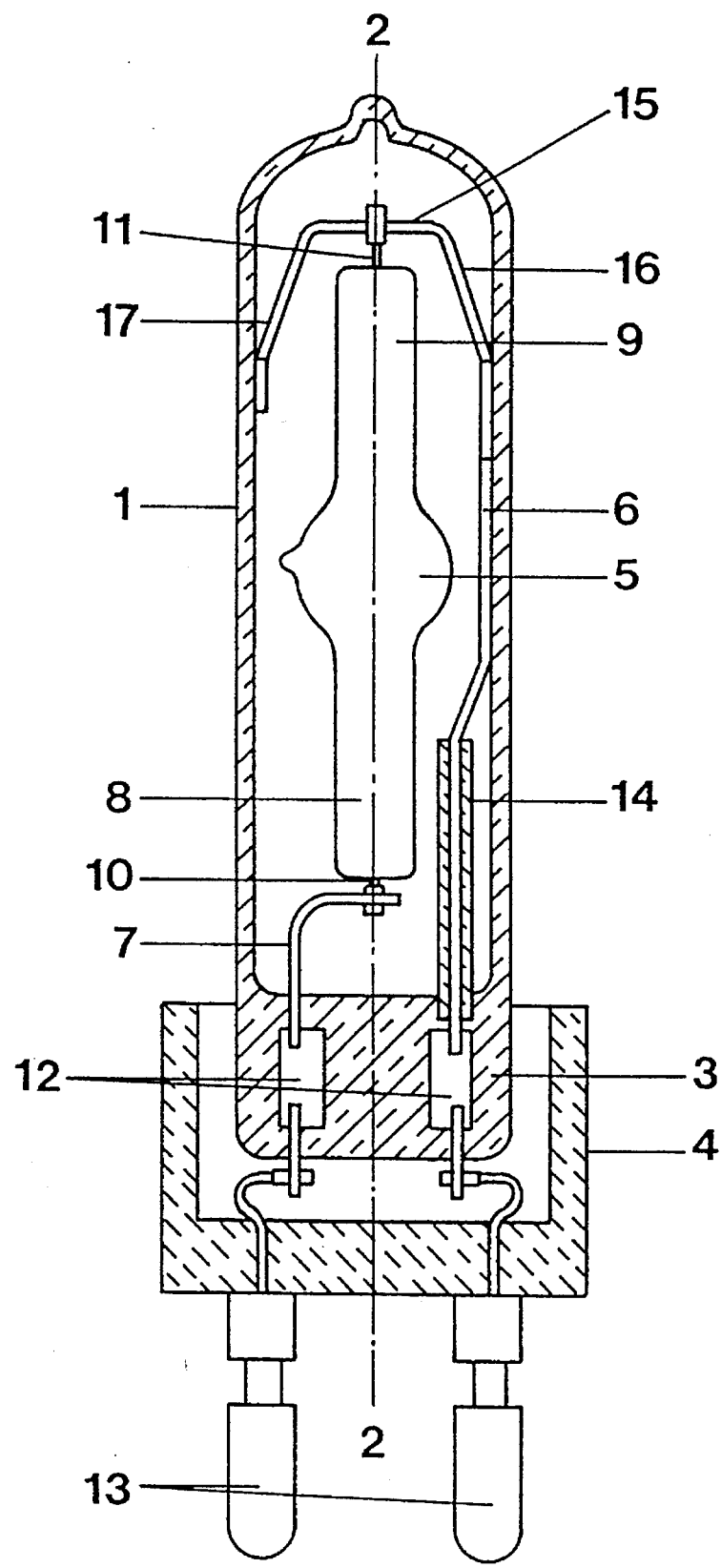
FIG. 1 is a highly schematic front view of a single-based high-pressure discharge lamp, with an outer surrounding envelope or bulb, partly in section.

The invention will be first described when used with a 575 W single-based metal halide discharge lamp, shown in FIG. 1.

A single-ended outer bulb 1 has a press seal 3, which is fitted in a lamp base 4 in any suitable and conventional manner. The lamp defines a central longitudinal axis 2. In accordance with a feature of the invention, the outer bulb 1 is made of doped quartz glass; the discharge vessel 5 itself is made of ordinary quartz glass. The discharge vessel 5 is axially symmetrically retained within the lamp structure by a metal frame element 6 and a lower support frame element 7. The frame element 6 and the element 7, together, form the mount for the discharge vessel 5. The discharge vessel 5, which defines therein a discharge chamber, has a base end 8 and a distal end 9, from which, respectively, current supply leads 10 and 11 extend. The current supply leads 10, 11 are, respectively, secured to the frame elements 7 and 6 and connected via molybdenum foils to external supply connectors 13. The molybdenum foils 12 are melt-sealed in the pinch seal 3 of the bulb 1.

The frame element 6 is surrounded by a glass sleeve 14 in the region of the base end 8 of the discharge vessel 5 in order to increase resistance against electrical arc-over. The frame element 6 is formed with a cross bar 15 extending perpendicularly with respect to the longitudinal axis 2, and which is welded to the distal current supply lead 11 from the lamp 5. The length of the cross bar 15 is less than the inner diameter of the outer bulb 1. Two inclined portions 16, 17 connect the cross bar 15 to longitudinal portions of the element 6 at either end, which engage, resiliently, against the inner wall of the outer bulb 1. Typical characteristics of the lamp are:

inner diameter of outer bulb 1: about 24 mm,
length of cross element 15: about 16 mm,
wall thickness of outer bulb 1: about 2 mm.

In accordance with a feature of the invention, the outer bulb 1 is made of doped quartz glass having a doping portion of 0.25% of cerium in the form of 0.31% cerium oxide, $CeO_2$. Additionally, 0.025% titanium is added, in the form of 0.042% titanium oxide, $TiO_2$.

Other data are found in Table 1, which forms part of the specification.

Figure 2:
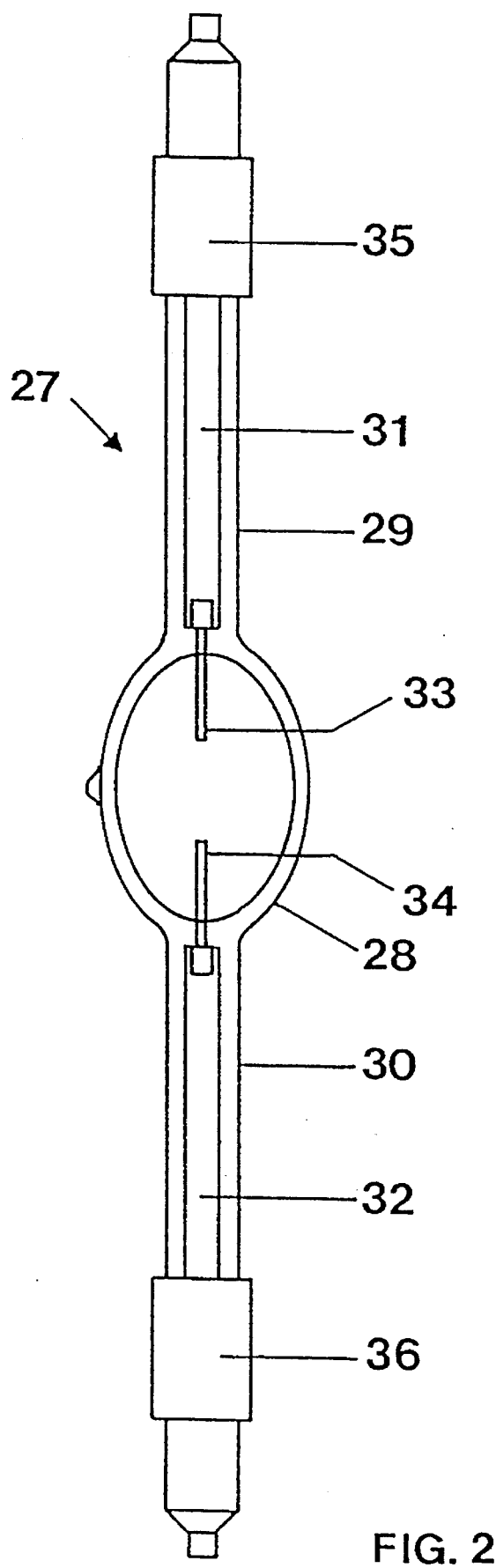
FIG. 2 is a highly schematic side view of a double-based high-pressure discharge lamp without an outer envelope or bulb.

FIG. 2 shows a metal halide high-pressure discharge lamp 27 having a rated power of 4 kW. The lamp 27 has an ellipsoid shaped discharge vessel 28 made of quartz glass doped in accordance with the present invention, to which necks 29, 30 are melt-connected coaxially with the discharge vessel 28. A molybdenum sealing foil 31, 32 is melt-sealed in the respective neck. A pin or rod-like electrode 33, 34 is connected to sealing foils 31, 32, respectively, at the end facing the discharge vessel. The electrodes 33, 34 are, typically, of tungsten. The ends of the sealing foils 31, 32 remote from the discharge vessel 28 are electrically connected with bases 35, 36 of the type SFa 21-12 which are fitted over the free ends of the necks 29, 30 and secured thereto by a suitable cement.

The fill data and characteristics of the lamp are shown in Table 2.

In accordance with a feature of the present invention, the discharge vessel 27 is made of quartz glass having 0.10% cerium, as such, for example in the form of 0.13% $CeO_2$ as well as 0.01% of titanium, as such, for example in the form of 0.017% of $TiO_2$. The remainder of the quartz glass is $SiO_2$. The cerium and titanium thus dope the quartz glass.

Figure 5:
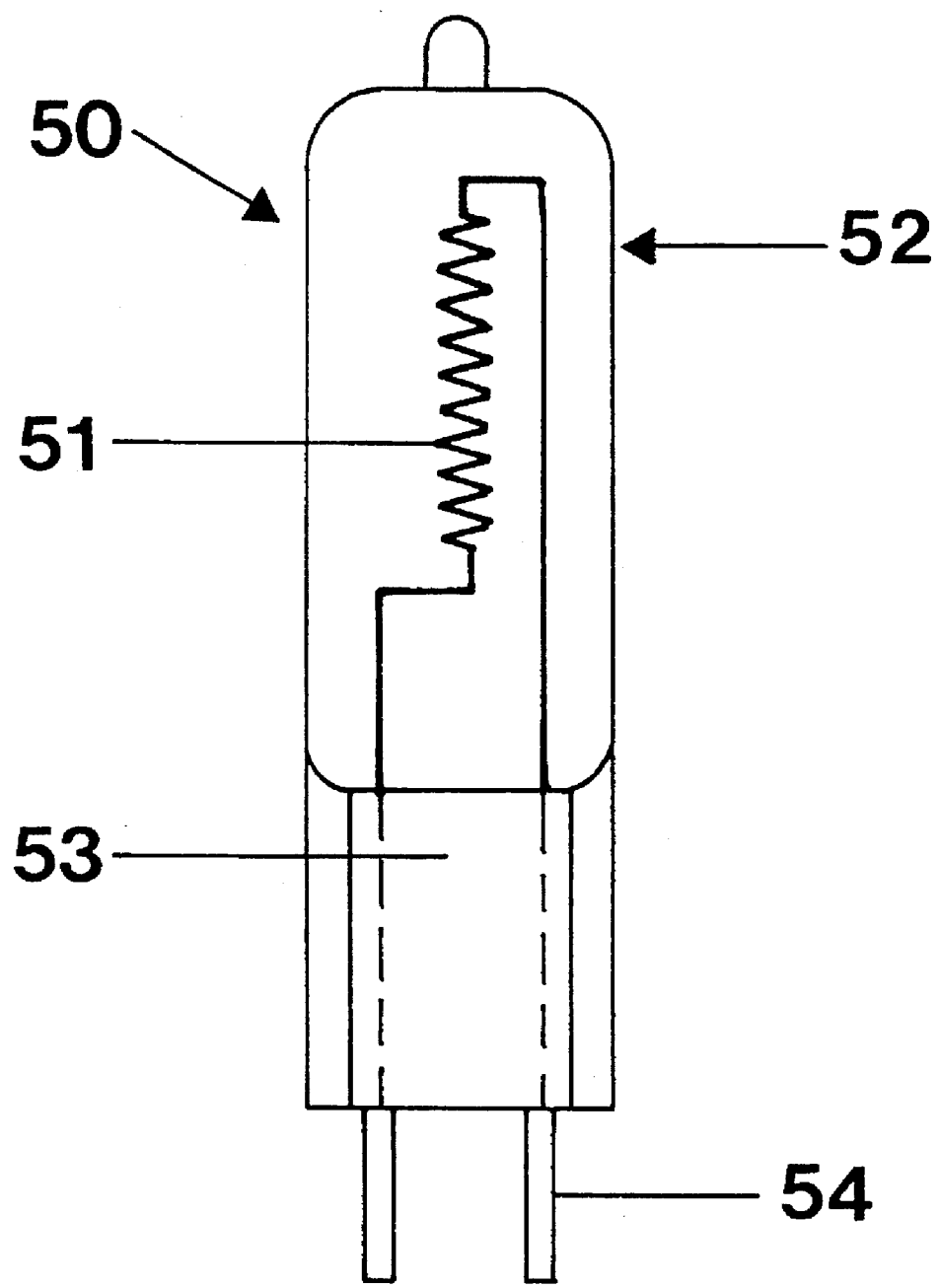
FIG. 5 is a highly schematic side view of a halogen incandescent lamp.

FIG. 5 shows a halogen incandescent lamp to which the present invention is also applicable. The lamp 50 has a filament 51 surrounded by a light transmissive bulb 52. The bulb 52 is closed by a pinch or press seal 53 in a vacuum tight manner. Two current supply leads 54 extend into the interior of the bulb 52 and. are connected to the filament 51. The bulb 52 is made of doped quartz glass having 0.10% cerium as such, for example in the form of 0.15% cerium aluminate.

The invention is not restricted to the examples shown and described. Other cerium compounds, particularly mixed oxides, can be used. Besides cerium, and possibly also titanium, aluminum can be added as a doping agent, particularly aluminum oxide, $Al_2O_3$.

Figure 3:
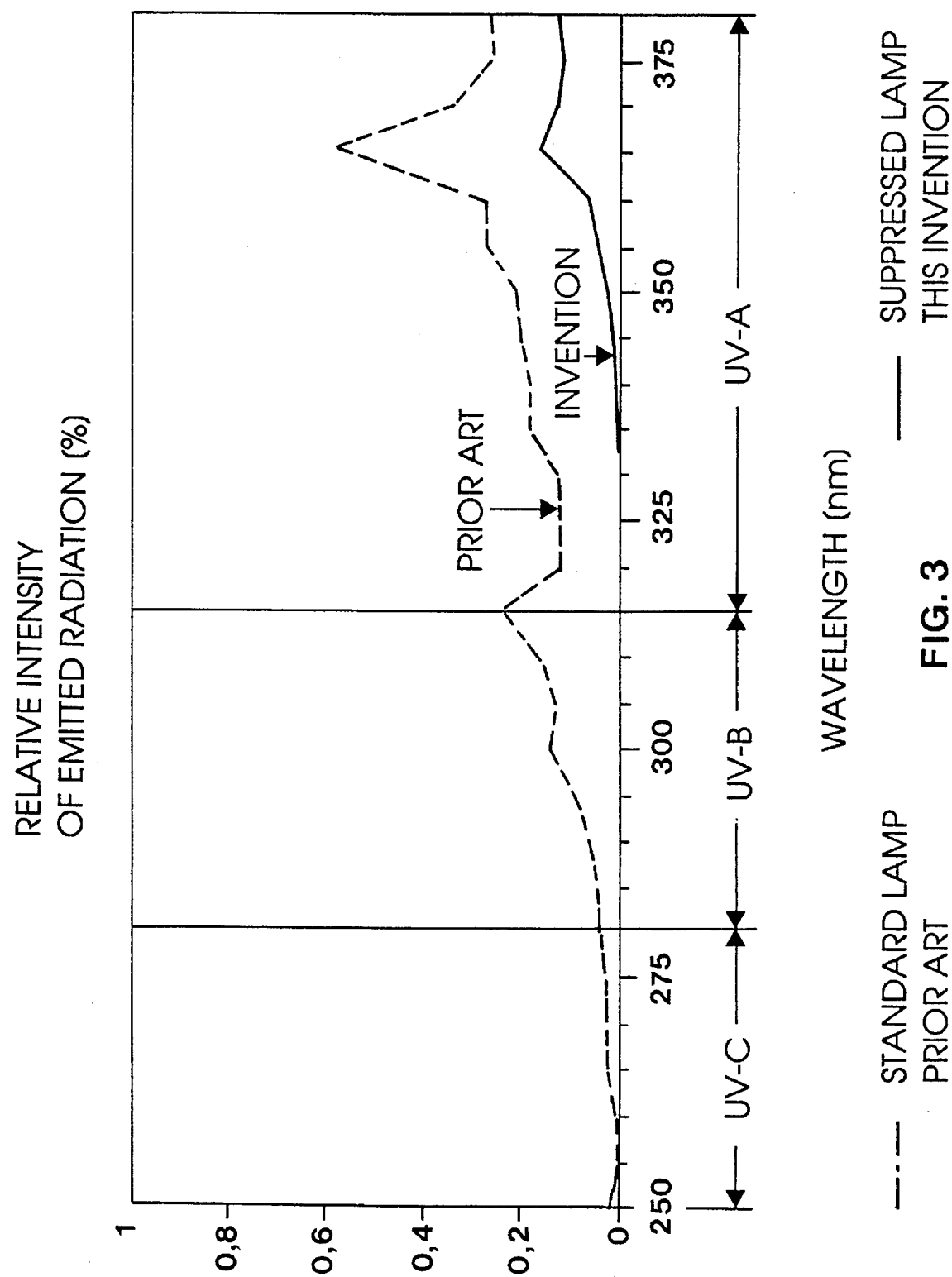
FIG. 3 is a diagram of a portion of the emitted spectrum of the lamp of FIG. 1, omitting the visible portion of the spectrum.

FIG. 3 illustrates a portion of the spectrum of the lamp of FIG. 1 in the wave length region between 250 nm and 380 nm. The broken-line, upper curve 1 shows a standard lamp in accordance with the prior art. Emission in the entire spectral range can be easily seen. By using the outer bulb 1, doped in accordance with the present invention, the UV radiation suppressed and attenuated lower solid-line curve results, and as can be clearly seen, emission is limited to the UV-A range, and there highly attenuated.

Adding aluminum, particularly initially as the mixed oxide cerium aluminate, $CeAlO_3$, has substantial advantages in manufacture, since the doping in the glass is particularly well distributed. The aluminum oxide addition can be substantial, so that, finally, the mol relationship of the cerium to the aluminum, which are both dissolved in a glass, can be between 1:1 and 0.2:1. Adding the aluminum in suitable quantity influences the viscosity and the devitrification characteristics of the doped glass.

In a particularly preferred example, which corresponds to the one shown in FIG. 1, the outer bulb 1 is made of quartz glass which has as doping agent 0.51% $CeAlO_3$ and 0.04% $TiO_2$ during manufacture; the mol relationship of the dissolved cerium to the aluminum will be 1:1. This corresponds to a nominal proportion of 0.12% $Al_2O_3$ and 0.39% $Ce_2O_3$.

Figure 4:
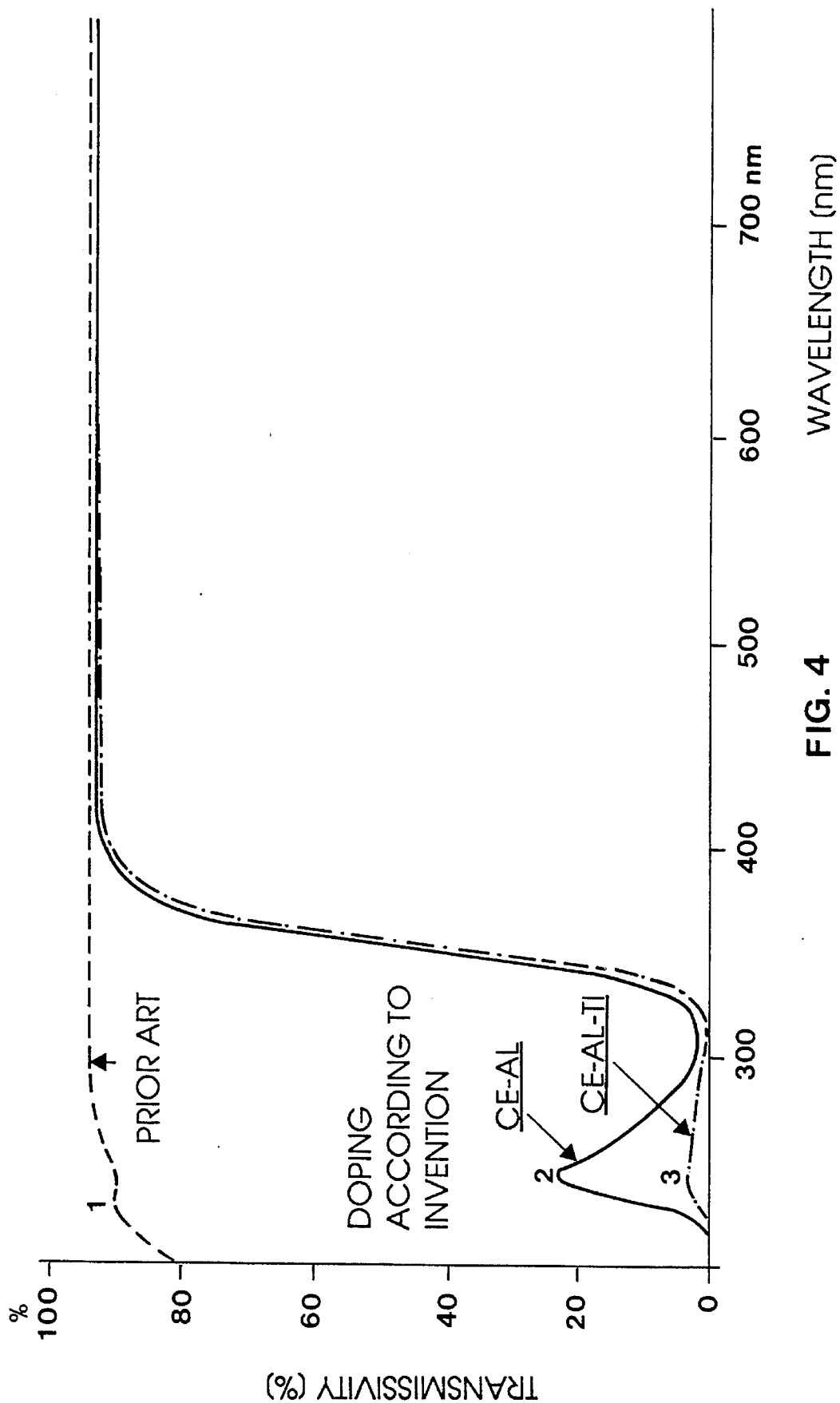
FIG. 4 is a diagram of wave length (abscissa) with respect to percentage of transmissivity (ordinate) of two types of glass of the present invention, and contrasted with a prior art glass.

FIG. 4 illustrates three transmission curves for different quartz-glass tubes, each having a wall thickness of 1 mm. The abscissa describes the wave length of electromagnetic radiation in nanometers; the vertical axis is the portion, in percent, of transmitted radiation.

The broken-line curve 1 clearly shows transmission conditions for undoped quartz glass in accordance with the prior art. Curves 2 and 3 show the transmission of two glasses in accordance with the present invention, in which curve 2 illustrates a glass having 0.51% $CeAlO_3$ added, and curve 3, in chain-dotted form, is the glass of curve 2 with a further addition of 0.04% of $TiO_2$ doping agent. The quartz-glass tube of curve 3, additionally, was annealed for about 10 hours in an oxygen atmosphere at 1100° C.

The starting product for the quartz melt was cerium aluminate, $CeAlO_3$, which was pulverized to have an average grain size of about 5 μm, and air-separated, together with pegmatitic, pure quartz sand and pulverized titanium oxide, $TiO_2$.

First, the pegmatitic quartz sand is cleaned and purified. In accordance with a particularly preferred embodiment of the invention, about 0.51% cerium aluminate ($CeAlO_3$) and about 0.04% titanium oxide ($TiO_2$), all percentages by weight, are homogeneously mixed with the purified pegmatitic quartz sand in a homogenizing apparatus. This starting mixture is then heated in a cylindrical tungsten vessel under a $He/H_2$ atmosphere at about 2200° C. continuously, to obtain a quartz-glass melt. It is drawn off vertically downwardly by a molybdenum nozzle with a molybdenum mandrel, and continuously extruded to a quartz-glass tube having a wall thickness of 1 mm.

Quartz-glass melting processes are well known. Features of the quartz-glass melting process not necessary or unimportant for the present invention are described in detail in the referenced U.S. Pat. No. 3,764,286, the disclosure of which is hereby incorporated by reference, and which thus need not be further explained again.

The process can be extended and, in another example, the finished quartz-glass tubes are, subsequently, subjected to an annealing process in an oxygen, $O_2$, atmosphere, at about 1100° C.

The quartz-glass tubes, as described, are used preferably as the outer bulbs 1 (FIG. 1) to enclose a discharge vessel, or as a discharge vessel directly, such as the vessel envelope 28 of FIG. 2; further, they can be used as filament enclosing vessels or bulbs, or as outer bulbs or lamp enclosures for halogen incandescent lamps, with or without further manufacturing processes, as required by the ultimate use.

PREPARATION OF DOPING SUBSTANCE

The doping substance cerium aluminate is made as follows:

A preliminary mixture made of cerium oxide, aluminum oxide and a mineralization aid is prepared. Small additives of boric acid, lithium borate ($Li_2B_4O_7$), and alkaline earth tetraborates, $NH_4HF_2$, alkali and alkaline earth fluorides are added, in small quantities, singly or in combination with each other. A typical quantity of the additives is 0.032% by weight (Table 3, examples 4 and 5).

Approximately 10% excess aluminum oxide with respect to the stoichiometric cerium aluminate composition is contained in the mixture, that is, for a mol relationship of aluminum oxide to cerium oxide, the relationship below should be satisfied at least approximately:

$$AL_2O_3:CeO_2=0.55:1.$$

The initial or starting mixture is homogenized in a tumbling mixer or an eccentrically rotating mixer having plastic vessels, using aluminum oxide balls, or steel balls coated with plastic. The cerium aluminate is thus formed, and is annealed or preheated at a temperature of about 1560° C. in a protective atmosphere of $N_2/H_2$ of about 80% nitrogen and 20% hydrogen, in covered corundum pots or cups, or crucibles. After cooling to room temperature, the pre-glowed or annealed material is ground in a mortar, and then passed through a sieve. To obtain a sufficiently fine-grained composition of the cerium aluminate, the coarse particles are separated by separation of the ground material in a centrifugal air separator, to obtain an average grain size of the cerium aluminate of up to about 20 μm, and preferably such that the average grain size of the cerium aluminate is about 5 μm.

Table 3 shows five examples for the starting mixture to make the doping material, cerium aluminate, $CeAlO_3$.

The invention is not restricted to the above-described examples. For example, the concentration of the cerium aluminate and/or the titanium oxide in the basic mixture which is melted with the quartz glass can be changed. The proportion of cerium aluminate should be between about 0.1% to 5%, by weight, and preferably between 0.1% to 2% by weight. The upper limit is determined by the solubility of the cerium in the quartz glass and the lower limit by the desired attenuation of the UV radiation in the doped quartz glass. Preferably, in order to obtain homogeneous quartz glass without bubbles, the proportion of cerium aluminate does not exceed 2% by weight. Titanium oxide can be added, but it need not be, and may be entirely absent. Additional doping materials could be added, for example aluminum oxide, in order to affect the viscosity and the devitrification characteristics of the quartz glass.

The geometry of the quartz glass tube which is extruded can be controlled by suitable adjustment of the molybdenum nozzle and the molybdenum mandrel. The dimensions of the extruded tube, likewise, can be changed thereby. Other forms of quartz-glass bodies can be made, for example rods or cast panels, to form transparent, but UV radiation-blocking shields, panels, filters, windows, or other glass elements subjected to UV radiation which is to be filtered or suppressed or at least highly attenuated.

Various changes and modifications may be made and any features described herein may be used with any of the others, within the scope of the inventive concept.

TABLE 1

|  | Fill 1 |
| --- | --- |
| $I_2$ | 0.36 mg |
| $Br_2$ | 0.54 mg |
| Cs | 0.27 mg |
| Dy | 0.32 mg |
| Hg | 42 mg |
| Ar | 220 mbar |
| rated power | 575 W |
| volume of discharge vessel | 1.80 ml |
| electrode spacing | 7 mm |
| arc voltage | 95 v |
| color temperature | 5600 K. |
| optical efficiency | 83 lm/W |
| color rendition index Ra | 90 |
| red color rendition index $R_9$ | 30 |
| rated operating life | 750 h |

TABLE 2

|  | Fill 2 |
| --- | --- |
| $I_2$ | 1.00 mg |
| $Br_2$ | 1.90 mg |
| Cs | 0.90 mg |
| Dy | 0.65 mg |
| Gd | 0.55 mg |
| Hg | 200 mg |
| Ar | 440 mbar |
| rated power | 4000 W |
| volume of discharge vessel | 24.5 ml |
| electrode spacing | 20 mm |
| arc voltage | 200 V |
| color temperature | 6000 K. |
| optical efficiency | 110 lm/W |
| color rendition index Ra | 95 |
| red color rendition index $R_9$ | 80 |
| rated operating life | 300 h |

TABLE 3

| | Components of starting mixture in grams (g) | | | | | |
| --- | --- | --- | --- | --- | --- | --- |
| No. | $Al_2O_3$ | $CeO_2$ | $H_3BO_3$ | $BaF_2$ | $MgF_2$ | $NH_4HF_2$ |
| 1 | 112.16 | 344.24 | 0.45 | — | — | — |
| 2 | 112.16 | 344.24 | 0.45 | 0.90 | — | — |
| 3 | 112.16 | 344.24 | 0.45 | — | 0.72 | 0.18 |
| 4 | 244.70 | 688.50 | 0.30 | — | — | — |
| 5 | 5384 | 16524 | 7.2 | — | — | — |

We claim:

1. A method of making a quartz glass tube from doped quartz glass having a doping compound which reduces the transmission of the doped quartz glass for ultraviolet radiation (UV) of wave lengths below 300 nm, wherein the doping compound comprises cerium and aluminum, wherein the cerium is present between 0.065% and 3.25% by weight with respect to the overall weight of the quartz glass, and wherein the mol relationship of aluminum dissolved in the quartz glass to cerium dissolved in the quartz glass is at least 1:1, comprising the steps of
melting together quartz sand, or rock crystal, or a mixture of quartz sand and rock crystal together with cerium aluminate ($CeAlO_3$) as a UV-absorbing doping compound for the quartz glass in a tungsten crucible, and continously extruding a quartz glass tube from the tungsten crucible.

2. The method of claim 1, further including a step of homogeneously admixing the cerium aluminate ($CeAlO_3$) in powder form to the quartz sand or the rock crystal, or the mixture of quartz sand and rock crystals.

3. The method of claim 2, wherein the average grain size of the cerium aluminate powder ($CeAlO_3$) is up to about 20 μm.

4. The method of claim 3, including a step of preparing the cerium aluminate powder by providing a starting mixture containing cerium oxide ($CeO_2$) and aluminum oxide ($Al_2O_3$) and heating the starting mixture to glowing or annealing temperature.

5. The method of claim 4, wherein the starting mixture comprises the aluminum oxide ($Al_2O_3$) and cerium oxide ($CeO_2$) in the following mol relationship:

$M(Al_2O_3)$ to $M(CeO_2)$ is at least 0.5, wherein $M(Al_2O_3)$ represents the amount of aluminum oxide measured in mol which is present in the mixture before heating, and wherein $M(CeO_2)$ represents the amount of cerium oxide measured in mol which is present in the mixture before heating.

6. The method of claim 4, further including adding boric acid ($H_3BO_3$) as a mineralization or melting and homogenization aid into the starting mixture.

7. The method of claim 2, wherein the proportion of cerium aluminate added to the quartz sand or the rock crystal, or the mixture of quartz sand and rock crystal, is up to about 5% by weight.

8. The method of claim 7, including a step of preparing the cerium aluminate powder by providing a starting mixture containing cerium oxide ($CeO_2$) and aluminum oxide ($Al_2O_3$) and heating the starting mixture to glowing or annealing temperature.

9. The method of claim 8, wherein the starting mixture comprises the aluminum oxide ($Al_2O_3$) and cerium oxide ($CeO_2$) in the following mol relationship:

$M(Al_2O_3)$ to $M(CeO_2)$ is at least 0.5, wherein $M(Al_2O_3)$ represents the amount of aluminum oxide measured in mol which is present in the mixture before heating, and wherein $M(CeO_2)$ represents the amount of cerium oxide measured in mol which is present in the mixture before heating.

10. The method of claim 9, further including adding boric acid ($H_3BO_3$) as a mineralization or melting and homogenization aid into the starting mixture.

11. The method of claim 2, wherein the proportion of cerium aluminate added to the quartz sand or the rock crystal, or the mixture of quartz sand rock crystal, is in the range of 0.1% to 2% by weight.

12. The method of claim 11, including a step of preparing the cerium aluminate powder by providing a starting mixture containing cerium oxide ($CeO_2$) and aluminum oxide ($Al_2O_3$) and heating the starting mixture to glowing or annealing temperature.

13. The method of claim 12, wherein the starting mixture comprises the aluminum oxide ($Al_2O_3$) and cerium oxide ($CeO_2$) in the following mol relationship:

$M(Al_2O_3)$ to $M(CeO_2)$ is least 0.5, wherein $M(Al_2O_3)$ represents the amount of aluminum oxide measured in mol which is present in the mixture before heating; and wherein $M(CeO_2)$ represents the amount of cerium oxide measured in mol which is present in the mixture before heating.

14. The method of claim 13, further including adding boric acid ($H_3BO_3$) as a mineralization or melting and homogenization aid into the starting mixture.

15. The method of claim 2, further including titanium oxide ($TiO_2$) homogeneously admixed as a further doping substance to the quartz sand or the rock crystal, or the mixture of quartz sand and rock crystal.

16. The method of claim 15, including a step of preparing the cerium aluminate powder by providing a starting mixture containing cerium oxide ($CeO_2$) and aluminum oxide ($Al_2O_3$) and heating the starting mixture to glowing or annealing temperature.

17. The method of claim 16, further including adding boric acid ($H_3BO_3$) as a mineralization or melting and homogenization aid into the starting mixture.

18. The method of claim 1, wherein the proportion of cerium aluminate added to the quartz sand or the rock crystal, or the mixture of quartz sand and rock crystal, is up to about 5%, by weight.

19. The method of claim 1, wherein the proportion of cerium aluminate added to the quartz sand or the rock crystal, or the mixture of quartz sand and rock crystal, is in the range of 0.1% to 2% by weight.

20. The method of claim 19, further including a step of heating the extruded quartz glass tube in an oxygen atmosphere.

21. The method of claim 20, further including titanium oxide ($TiO_2$) homogeneously admixed as a further doping substance to the quartz sand or the rock crystal, or the mixture of quartz sand and rock crystal.

22. The method of claim 21, wherein the heating step comprises heating the quartz glass to glow temperature at about 1100° C. for a time of several hours.

23. The method of claim 20, further including a step of heating the extruded quartz glass tube in an oxygen atmosphere.

24. The method of claim 1, further including titanium oxide ($TiO_2$) homogeneously admixed as a further doping substance to the quartz sand or the rock crystal, or the mixture of quartz sand and rock crystal.

25. The method of claim 24, wherein the quantity of titanium oxide mixture with the quartz sand or the rock crystal, or the mixture of quartz sand and rock crystal, is up to about 0.05% by weight.

26. The method of claim 24, wherein the quantity of titanium oxide mixed with the quartz sand or the rock crystal, or the mixture of quartz sand and rock crystal, is between about 0.02% to 0.03% by weight.

27. The method of claim 24, wherein the proportion of cerium aluminate added to the quartz sand or the rock crystal, or the mixture of quartz sand and rock crystal, is up to about 5%, by weight.

28. The method of claim 27, further including a step of heating the extruded quartz glass tube in an oxygen atmosphere.

29. The method of claim 1, further including a step of heating the extruded quartz glass tube in an oxygen atmosphere.

30. The method of claim 29, wherein the heating step comprises heating the quartz glass to glow temperature at about 1100° C. for a time of several hours.

31. The method of claim 29, wherein the heating step comprises heating the quartz glass to glow temperature at about 1100° C. for a time of about 10 hours.

32. The method of claim 1, further including a step of heating the doped quartz glass tube in an oxygen atmosphere.

* * * * *